United States Patent

Yanagisawa et al.

[11] Patent Number: 6,011,088
[45] Date of Patent: Jan. 4, 2000

[54] ORGANIC SILICON COMPOUNDS, INORGANIC FILLERS TREATED THEREWITH, AND ELECTRICALLY INSULATING COMPOSITIONS

[75] Inventors: Hideyoshi Yanagisawa; Shoji Ichinohe, both of Usui-gun, Japan

[73] Assignee: Shin-Etsu Chemical Co., Ltd., Tokyo, Japan

[21] Appl. No.: 09/017,679

[22] Filed: Feb. 3, 1998

[30] Foreign Application Priority Data

Feb. 5, 1997 [JP] Japan .................................. 9-037192

[51] Int. Cl.[7] .............................. C08K 9/06; C08K 3/34; C08G 77/04
[52] U.S. Cl. .......................... 523/212; 528/29; 524/442; 524/445; 524/451; 524/492; 524/529; 524/534; 524/588; 525/72; 525/87; 525/88; 523/203; 523/205
[58] Field of Search .............................. 528/29; 524/529, 524/534, 445, 451, 442, 492, 588; 529/72, 87, 88; 523/203, 205, 212

[56] References Cited

U.S. PATENT DOCUMENTS

| | | | |
|---|---|---|---|
| 3,802,913 | 4/1974 | MacKenzie, Jr. | 117/232 |
| 3,957,719 | 5/1976 | MacKenzie, Jr. | 264/174 |
| 4,125,509 | 11/1978 | Vostovich | 260/33.6 |
| 4,133,936 | 1/1979 | Vostovich | 428/389 |
| 4,297,145 | 10/1981 | Wolff et al. | 106/308 |
| 4,549,041 | 10/1985 | Shingo et al. | 174/113 R |
| 4,714,733 | 12/1987 | Itoh et al. | 524/493 |
| 4,808,643 | 2/1989 | Lemoine et al. | 524/87 |
| 4,816,337 | 3/1989 | Schultz | 428/372 |
| 4,894,281 | 1/1990 | Yagi et al. | 428/286 |
| 5,312,861 | 5/1994 | Meverden et al. | 524/521 |
| 5,492,760 | 2/1996 | Sarma et al. | 428/378 |

Primary Examiner—Samuel A. Acquah
Attorney, Agent, or Firm—Millen, White, Zelano & Branigan, P.C.

[57] ABSTRACT

Novel organic silicon compounds of formula (1) are provided.

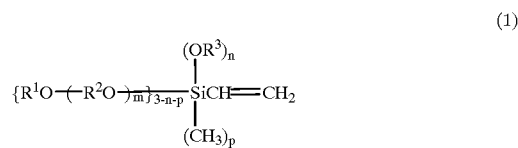

(1)

$R^1$ is a monovalent $C_1$–$C_4$ hydrocarbon group, $R^2$ is a divalent $C_2$–$C_3$ hydrocarbon group, $R^3$ is a monovalent $C_1$–$C_2$ hydrocarbon group, m is an integer of 3–10, n is equal to 0, 1 or 2, p is equal to 0 or 1, and the sum of n+p is equal to 0, 1 or 2. Inorganic fillers are surface treated with the organic silicon compounds. Compositions comprising EPR and/or EPDM in admixture with the treated inorganic fillers are electrically insulating and have improved oil resistance and mechanical strength.

4 Claims, 2 Drawing Sheets

ORGANIC SILICON COMPOUNDS, INORGANIC FILLERS TREATED THEREWITH, AND ELECTRICALLY INSULATING COMPOSITIONS

BACKGROUND OF THE INVENTION

1. Field of the Invention

This invention relates to a novel organic silicon compound useful as a surface treating agent for an inorganic filler. It also relates to an inorganic filler surface treated with the organic silicon compound and an electrically insulating composition loaded with the filler.

2. Prior Art

Ethylene-propylene rubber (EPR) and ethylene-propylene-diene terpolymer (EPDM) are widely used as insulators and sheath materials for electric conductors and cables since they have superior heat resistance and weather resistance as well as electrically insulating properties.

However, EPR and EPDM are less resistant to oil and must be loaded with large amounts of inorganic fillers such as clay and talc for improving oil resistance. Rubber compositions loaded with large amounts of inorganic fillers, however, become hygroscopic and suffer from an undesirable drop of electrical insulation.

An attempt was made to improve the moisture resistance of inorganic fillers by treating the fillers with the compound of the following general formula (i).

$$(CH_3OCH_2CH_2O)_3SiCH=CH_2 \quad (i)$$

Regrettably, when inorganic materials are surface treated with the compound of formula (i), this compound generates methyl cellosolve which is toxic.

Similar known compounds include vinyltrimethoxysilane, vinyltriethoxysilane and vinylmethyldimethoxysilane. When inorganic materials are treated directly with these compounds, the treatment does not proceed to a full extent on account of their low boiling point, failing to achieve the desired properties.

SUMMARY OF THE INVENTION

An object of the invention is to provide an organic silicon compound which is useful for the surface treatment of inorganic fillers blended in electrically insulating compositions. Another object of the invention is to provide an inorganic filler surface treated with the organic silicon compound. A further object of the invention is to provide an electrically insulating composition loaded with the treated inorganic filler and having improved properties including oil resistance.

In a first aspect, the present invention provides a novel organic silicon compound of the following general formula (1).

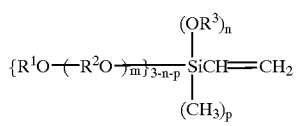
(1)

$R^1$ is a monovalent hydrocarbon group having 1 to 4 carbon atoms, $R^2$ is a divalent hydrocarbon group having 2 to 3 carbon atoms, $R^3$ is a monovalent hydrocarbon group having 1 to 2 carbon atoms, letter m is an integer of 3 to 10, n is equal to 0, 1 or 2, p is equal to 0 or 1, and the sum of n+p is equal to 0, 1 or 2.

In a second aspect, the present invention provides an inorganic filler surface treated with the organic silicon compound.

In a third aspect, the present invention provides an electrically insulating composition comprising an ethylene-propylene rubber (EPR) and/or ethylene-propylene-diene terpolymer (EPDM) in admixture with the inorganic filler.

We have found that the novel organic silicon compounds of formula (1) can be prepared by the methods to be described later and that they are useful as a surface treating agent for inorganic fillers such as clay and talc. Most inorganic fillers can be treated with the organic silicon compounds of formula (1) without giving off toxic substances such as methyl cellosolve. When the inorganic fillers treated with the organic silicon compounds of formula (1) are blended in EPR or EPDM, the resulting compositions are not only electrically insulating, but also have improved oil resistance, mechanical strength, heat resistance, and weather resistance.

DETAILED DESCRIPTION OF THE INVENTION

Figure 1:
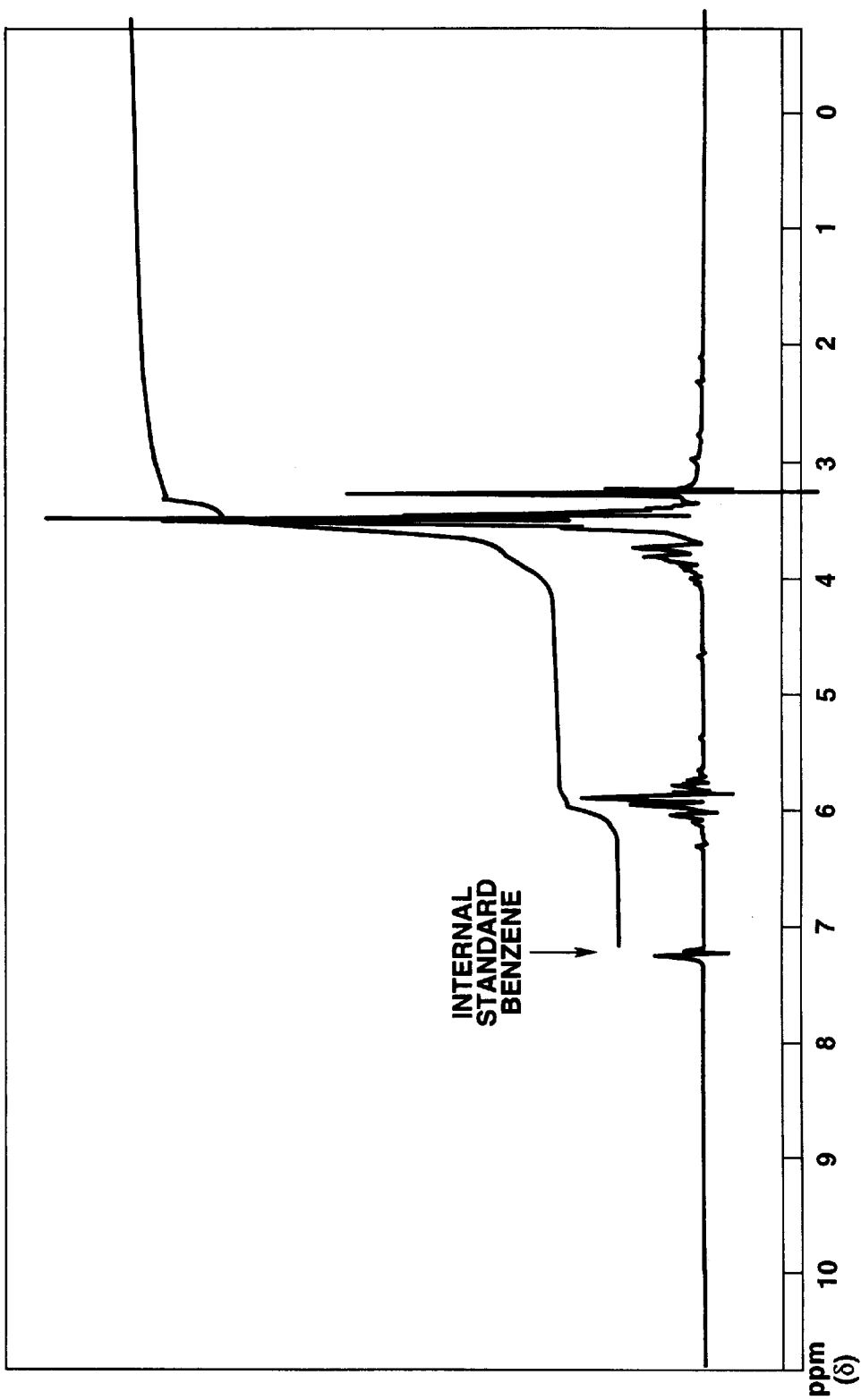
FIG. 1 is an NMR spectrum of the compound of Example 1.

The novel organic silicon compounds of the invention are represented by the following general formula (1), with those compounds of the following general formula (1a) being especially preferred.

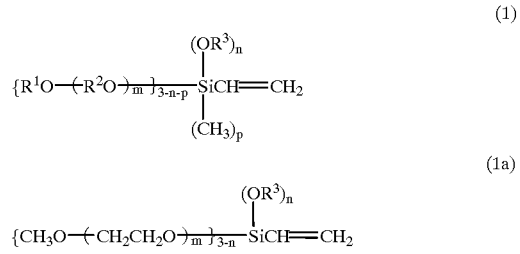

In formula (1), $R^1$ is a monovalent hydrocarbon group having 1 to 4 carbon atoms, examples of which are given below.

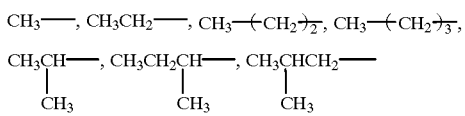

$R^2$ is a divalent hydrocarbon group having 2 to 3 carbon atoms, examples of which are given below.

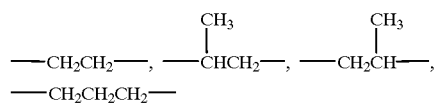

In formula (1) and (1a), $R^3$ is a monovalent hydrocarbon group having 1 to 2 carbon atoms, for example, $CH_3$— or $CH_3CH_2$—.

Letter m is an integer of 3 to 10, n is equal to 0, 1 or 2, p is equal to 0 or 1, and the sum of n+p is equal to 0, 1 or 2.

Examples of the organic silicon compound are given below.

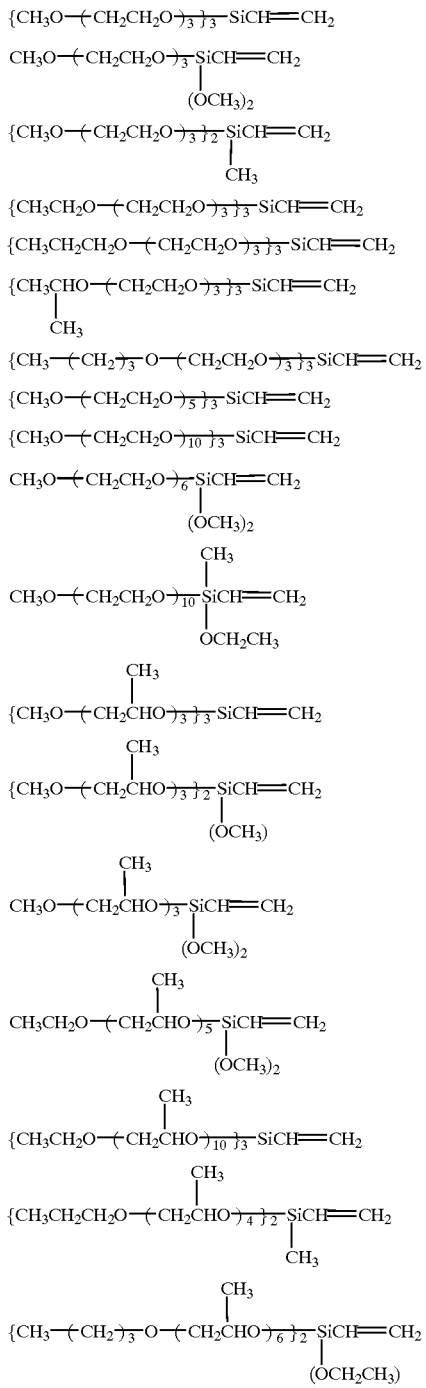

The organic silicon compounds of the invention can be synthesized by several methods. Two typical methods are described below.

A first typical method involves mixing 1 mol of a compound of the following general formula (2) with 1 to 3 mol of a compound of the following general formula (3), effecting dehydrochlorination reaction and optionally, further reacting the reaction product with 1 to 2 mol of a compound of the following general formula (4).

Herein, $R_1$, $R^2$, $R^3$, m, and p are as defined above.

Examples of the compound of formula (2) are given below.

$Cl_3SiCH=CH_2$

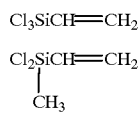

Typical examples of the compound of formula (3) are given below.

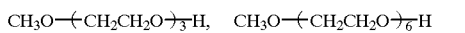

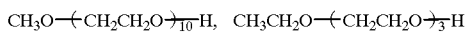

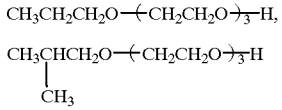

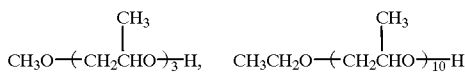

Examples of the compound of formula (4) are $CH_3OH$ and $CH_3CH_2OH$.

To the reaction system, a dehydrochlorinating agent is optionally added. For example, urea, tertiary amine compounds such as triethylamine and pyridine, metal alcoholates such as sodium methylate are added.

A solvent is also used if desired. Exemplary solvents include aromatic hydrocarbons such as toluene, benzene, and xylene, aliphatic hydrocarbons such as hexane, pentane, octane, and decane, ester compounds such as ethyl acetate and butyl acetate, and ether compounds such as diethyl ether, diisopropyl ether, tetrahydrofuran, and dioxane.

In a second typical method, the inventive compound is prepared by mixing 1 mol of a compound of the following general formula (5) with 1 to 3 mol of a compound of formula (3) and effecting silyl ester exchange reaction.

Herein, $R^1$, $R^2$, $R^3$, m, and p are as defined above.

Examples of the compound of formula (5) are given below.

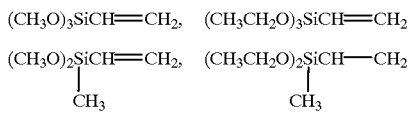

Examples of the compound of formula (3) are already given.

A catalyst may be used in this reaction. Useful catalysts are titanium compounds such as tetrabutyltitanate; tin compounds such as dibutyltin dilaurate and dibutyltin oxide; alkali catalysts such as sodium hydroxide and potassium silicate; and acid catalysts such as hydrochloric acid and sulfuric acid. The use of a solvent is optional while exemplary solvents are as described above.

The inventive compounds are used as a surface treating agent for inorganic fillers. The inorganic fillers which can be treated with the inventive compounds include clay (including hard clay and soft clay), talc, silica, aluminum hydroxide, and magnesium hydroxide. These fillers may be used alone or in admixture of two or more.

Preferably, the inorganic filler is treated with 0.1 to 10% by weight, more preferably 0.5 to 3% by weight of the organic silicon compound of formula (1).

The treatment of inorganic fillers may be carried out by any desired procedure, for example, by directly adding dropwise the inventive compound to the filler, spraying the inventive compound to the filler, or diluting the inventive compound with a suitable solvent such as water or alcohol and dipping the filler therein.

The inorganic fillers treated with the organic silicon compounds of formula (1) are blended in electrically insulating compositions based on EPR and/or EPDM. The resulting compositions have superior oil resistance, heat resistance, weather resistance, and electrical insulating properties.

The electrically insulating composition is preferably obtained by blending 100 parts by weight of EPR and/or EPDM with about 30 to about 150 parts by weight of the surface treated inorganic filler. Compositions containing less than 30 parts of the filler would have a high insulation resistivity, but poor oil resistance whereas compositions containing more than 150 parts of the filler would have superior oil resistance, but become hygroscopic with the risk of diminishing insulation resistivity.

When the inorganic filler is blended in EPR or EPDM, it is not essential to previously treat the filler with the inventive compound. The organic silicon compound of the invention may be added when EPR and/or EPDM and the inorganic filler are mixed because the compound quickly adsorbs on the inorganic filler, achieving equivalent results.

The composition of the invention may be crosslinked on use. Useful crosslinking agents are organic peroxides, for example, dicumyl peroxide and 2,5-dimethyl-2,5-di(t-butylperoxy)hexyne-3. Co-crosslinking agents such as triallyl isocyanurate, N,N'-m-phenylenebismaleimide and trimethylolpropane trimethacrylate are also used, if desired, for increasing crosslinking efficiency.

If desired, the composition of the invention further contains various additives, for example, processing aids, antioxidants, and pigments.

The novel organic silicon compounds of formula (1) are useful as a surface treating agent for inorganic fillers. Inorganic fillers can be treated with the organic silicon compounds without giving off toxic substances such as methyl cellosolve. EPR or EPDM base compositions loaded with the treated inorganic fillers are fully electrically insulating and have superior oil resistance, mechanical strength, heat resistance, and weather resistance.

EXAMPLE

Examples of the present invention are given below by way of illustration and not by way of limitation. All percents are by weight.

Example 1

A 1-liter separable flask equipped with a stirrer, thermometer, dripping funnel, and reflux condenser was charged with 444.6 g (3.0 mol) of vinyltrimethoxysilane of the formula: $(CH_3O)_3SiCH=CH_2$ and 82.0 g (0.5 mol) of methyl triglycol of the formula: $CH_3O-(CH_2CH_2O)_3-H$. The contents were stirred for 50 hours at 90° C. The completion of reaction was confirmed by gas chromatography as the disappearance of methyl triglycol.

After the excess vinyltrimethoxysilane was distilled off, the reaction solution was further purified by distillation, collecting 85.2 g of a colorless clear liquid at a boiling point of 125° C. at 2 mmHg.

The product was analyzed by proton NMR spectroscopy and infrared (IR) absorption spectroscopy. From the results, the product was identified to have the following formula. The yield was 60.8%.

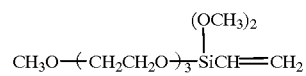

Figure 2:
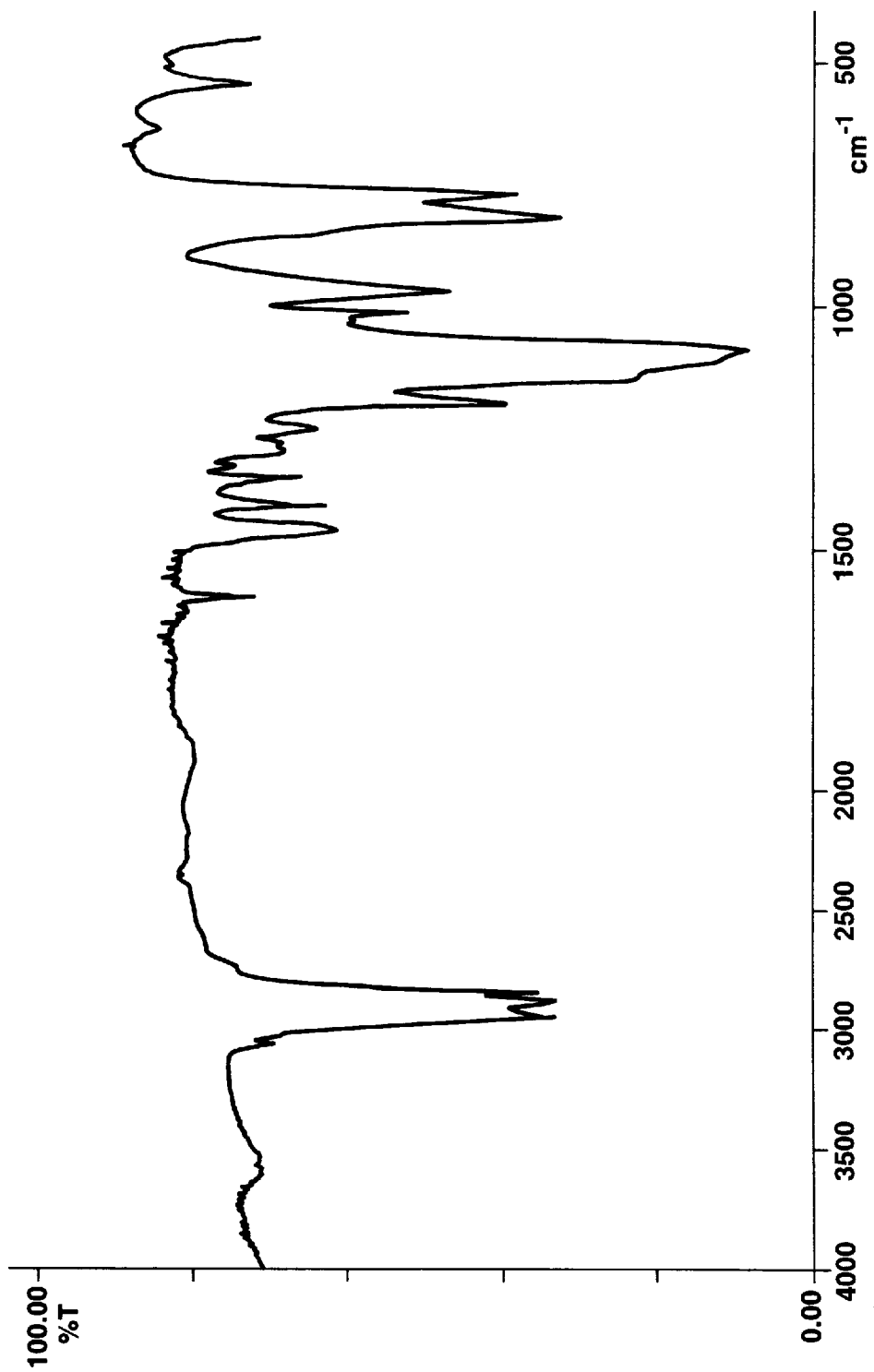
FIG. 2 is an IR spectrum of the compound of Example 1.

$^1$H-NMR analysis, FIG. 1
  δ=7.24 internal standard benzene
  δ=3.1–4.1 ppm (m, 21 H):
    Si—O—CH$_3$
    Si—O—CH$_2$CH$_2$O
    CH$_2$O—CH$_2$CH$_2$O
    CH$_2$O—CH$_3$
  δ=5.7–6.3 ppm (m, 3 H):
Si—CH=CH$_2$
IR analysis, FIG. 2
  1090 cm$^{-1}$: SiOC
  2942 cm$^{-1}$: C—H
  2878 cm$^{-1}$: C—H
  2842 cm$^{-1}$: C—H
  1599 cm$^{-1}$: —CH=CH$_2$
  1409 cm$^{-1}$: —CH=CH$_2$ Example 2

A flask as used in Example 1 was charged with 80.75 g (0.5 mol) of vinyltrichlorosilane represented by the formula: $Cl_3SiCH=CH_2$ and 216.0 g (3.6 mol) of urea. To the mixture at 80° C., 849.6 g (1.8 mol) of polyoxyethylene monomethyl ether represented by the formula: $CH_3O-(CH_2CH_2O)_{10}-H$ was slowly added dropwise. Thereafter, the reaction mixture was stirred for 2 hours at 80° C. The reaction mixture was cooled down whereupon it separated into two layers. From the upper layer was collected 799.4 g of a pale yellow clear liquid.

The product was analyzed by proton NMR spectroscopy and IR spectroscopy. From the results, the product was identified to be a mixture of an end compound of the formula: [CH$_3$O—(CH$_2$CH$_2$O)$_{10}$—]$_3$—SiCH=CH$_2$ and the unreacted CH$_3$O—(CH$_2$CH$_2$O)$_{10}$—H. The yield of the end compound was 91.3%.

Examples 3–5

Reaction was carried out as in Example 1 using compound (a) and compound (b) shown in Table 1. The liquids obtained were analyzed by proton NMR spectroscopy and IR spectroscopy to find that compound (c) shown in Table 1 was produced.

sprayed. At the end of spraying, mixing was continued for 3 minutes. Thereafter, the clay was dried at 100° C. for one hour.

$$(CH_3O)_3SiCH=CH_2 \quad (X)$$

$$(CH_3CH_2O)_3SiCH=CH_2 \quad (Y)$$

Examples 6–10 and Comparative Examples 1–3

Electrically insulating compositions were prepared in accordance with the formulation shown in Table 2.

TABLE 1

| | Compound (a) | Compound (b) | Compound (c) |
|---|---|---|---|
| Example 3 | (CH$_3$)$_2$SiCH=CH$_2$<br>\|<br>CH$_3$ | CH$_3$CH$_2$O—(CH$_2$CH$_2$O)$_3$—H | {CH$_3$CH$_2$O—(CH$_2$CH$_2$O)$_3$}$_2$<br>—SiCH=CH$_2$<br>\|<br>CH$_3$ |
| | 1 mol | 2 mol | |
| Example 4 | (CH$_3$CH$_2$O)$_3$SiCH=CH$_2$ | CH$_3$—(CH$_2$)$_3$—O—<br>—(CH$_2$CH$_2$O)$_5$—H | CH$_3$—(CH$_2$)$_3$—O—(CH$_2$CH$_2$O)$_5$<br>—SiCH=CH$_2$<br>\|<br>(OCH$_2$CH$_3$)$_2$ |
| | 1 mol | 1 mol | |
| Example 5 | (CH$_3$O)$_3$SiCH=CH$_2$ | CH$_3$<br>\|<br>CH$_3$O—(CH$_2$CHO)$_{10}$—H | {CH$_3$O—(CH$_2$CHO)$_{10}$}$_2$<br>\|<br>CH$_3$<br>—SiCH=CH$_2$<br>\|<br>OCH$_3$ |
| | 1 mol | 2 mol | |

Treatment Examples 1–7

The inorganic filler used was clay. A Henschel mixer was charged with 100 parts by weight of clay, on which 1 part by weight of each of the compounds of Examples 1 to 5 and compounds of the formulae (X) and (Y) shown below was

TABLE 2

| | Example | | | | | Comparative Example | | |
|---|---|---|---|---|---|---|---|---|
| Composition (pbw) | 6 | 7 | 8 | 9 | 10 | 1 | 2 | 3 |
| EPDM | 100 | 100 | 100 | 100 | 100 | 100 | 100 | 100 |
| Clay (treated with compound of Example 1) | 50 | — | — | — | — | — | — | — |
| Clay (treated with compound of Example 2) | — | 50 | — | — | — | — | — | — |
| Clay (treated with compound of Example 3) | — | — | 50 | — | — | — | — | — |
| Clay (treated with compound of Example 4) | — | — | — | 50 | — | — | — | — |
| Clay (treated with compound of Example 5) | — | — | — | — | 50 | — | — | — |
| Clay (untreated) | — | — | — | — | — | 50 | — | — |

TABLE 2-continued

| Composition (pbw) | Example | | | | | Comparative Example | | |
|---|---|---|---|---|---|---|---|---|
| | 6 | 7 | 8 | 9 | 10 | 1 | 2 | 3 |
| EPDM | 100 | 100 | 100 | 100 | 100 | 100 | 100 | 100 |
| Clay (treated with compound X) | — | — | — | — | — | — | 50 | — |
| Clay (treated with compound Y) | — | — | — | — | — | — | — | 50 |
| Dicumyl peroxide | 3 | 3 | 3 | 3 | 3 | 3 | 3 | 3 |
| Stearic acid | 1 | 1 | 1 | 1 | 1 | 1 | 1 | 1 |
| p-phenylenediamine | 3 | 3 | 3 | 3 | 3 | 3 | 3 | 3 |
| Zinc oxide | 3 | 3 | 3 | 3 | 3 | 3 | 3 | 3 |

The compositions were subject to various tests. Insulation resistance ($\Omega$-cm) was measured at 25° C. before and after immersion in water at 40° C. for 24 hours. Tensile strength and percent elongation were measured before and after immersion in oil at 70° C. for 4 hours. The retention of tensile strength was calculated from the initial tensile strength and the tensile strength after oil immersion. Similarly, the retention of elongation was calculated from the initial elongation and the elongation after oil immersion. The results are shown in Table 3.

TABLE 3

| | | Example | | | | | Comparative Example | | |
|---|---|---|---|---|---|---|---|---|---|
| | | 6 | 7 | 8 | 9 | 10 | 1 | 2 | 3 |
| Insulation resistance ($\Omega$-cm) | Initial | $5.0 \times 10^{15}$ | $4.0 \times 10^{15}$ | $4.5 \times 10^{15}$ | $4.0 \times 10^{15}$ | $4.0 \times 10^{15}$ | $1.2 \times 10^{15}$ | $2.0 \times 10^{15}$ | $3.0 \times 10^{15}$ |
| | After water immersion | $4.0 \times 10^{14}$ | $4.0 \times 10^{14}$ | $3.5 \times 10^{14}$ | $3.5 \times 10^{14}$ | $4.0 \times 10^{14}$ | $8.0 \times 10^{13}$ | $1.0 \times 10^{14}$ | $1.2 \times 10^{14}$ |
| Tensile strength (kgf/mm²) | | 1.80 | 1.75 | 1.78 | 1.75 | 1.71 | 0.85 | 1.20 | 1.50 |
| Elongation (%) | | 140 | 145 | 150 | 145 | 145 | 250 | 180 | 165 |
| Retention of tensile strength (%) | | 92 | 90 | 90 | 91 | 90 | 60 | 80 | 85 |
| Retention of elongation (%) | | 85 | 80 | 87 | 80 | 82 | 50 | 65 | 72 |

As is evident from Table 3, electrically insulating compositions within the scope of the invention have superior oil resistance and high tensile strength.

In contrast, electrically insulating compositions which do not use the fillers treated with the inventive compounds are poor in insulation resistance maintenance, oil resistance and tensile strength.

Although some preferred embodiments have been described, many modifications and variations may be made thereto in the light of the above teachings. It is therefore to be understood that within the scope of the appended claims, the invention may be practiced otherwise than as specifically described.

We claim:

1. An organic silicon compound of the following general formula (1):

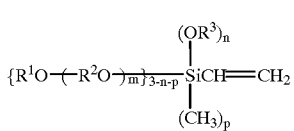

(1)

wherein $R^1$ is a monovalent hydrocarbon group having 1 to 4 carbon atoms, $R^2$ is a divalent hydrocarbon group having 2 to 3 carbon atoms, $R^3$ is a monovalent hydrocarbon group having 1 to 2 carbon atoms, letter m is an integer of 3 to 10, n is equal to 0, 1 or 2, p is equal to 0 or 1, and the sum of n+p is equal to 0, 1 or 2.

2. The organic silicon compound of claim 1 which has the following general formula (1a):

$$\{R^1O\text{---}(R^2O\text{---})_{\overline{m}}\}_{3\text{-}n\text{-}p}\overset{(OR^3)_n}{\underset{(CH_3)_p}{\text{Si}}}CH=CH_2 \qquad (1)$$

wherein $R^3$, m and n are as defined above.

3. An inorganic filler surface treated with the organic silicon compound of claim 1.

4. An electrically insulating composition comprising an ethylene-propylene rubber and/or ethylene-propylene-diene terpolymer in admixture with the inorganic filler of claim 3.

* * * * *